(12) United States Patent
Hsu et al.

(10) Patent No.: US 7,269,521 B2
(45) Date of Patent: Sep. 11, 2007

(54) METHOD FOR ANALYZING POWER DISTRIBUTION SYSTEM AND RELATED TECHNIQUES

(75) Inventors: Jimmy Hsu, Taipei Hsien (TW); Randy Hsiao, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 0 days.

(21) Appl. No.: 11/459,643

(22) Filed: Jul. 25, 2006

(65) Prior Publication Data

US 2007/0040535 A1  Feb. 22, 2007

(30) Foreign Application Priority Data

Aug. 19, 2005  (TW) .............................. 94128436 A

(51) Int. Cl.
*G01R 15/00* (2006.01)
(52) U.S. Cl. ....................................................... 702/57
(58) Field of Classification Search ................ 702/57, 702/58, 60, 64; 716/4, 6; 361/763, 793, 361/795; 323/223; 307/69
See application file for complete search history.

(56) References Cited

U.S. PATENT DOCUMENTS 6,546,528 B1 * 4/2003 Sasaki et al. ................... 716/5
6,847,527 B2 * 1/2005 Sylvester et al. ........... 361/763

* cited by examiner

*Primary Examiner*—Bryan Bui
(74) *Attorney, Agent, or Firm*—Winston Hsu

(57) ABSTRACT

The methodology includes a single excitation analysis, a multi-excitation analysis, and a simultaneous switch noise, SSN, analysis. A chip connects to the PDS at a plurality of power ports formed by pads for obtaining biasing voltage and current from those power ports. The single excitation analysis includes respectively making each of power ports start conducting current, and measuring a voltage provided by the power port. An equivalent impedance of each power port is obtained. The multi-excitation analysis includes making a given power port conduct a given current, and measuring voltages at other power ports for evaluating mutual couplings across different power ports. The SSN analysis includes respectively making different numbers of power ports conduct currents and accordingly evaluating different equivalent impedances corresponding to different SSN situations.

19 Claims, 11 Drawing Sheets

METHOD FOR ANALYZING POWER DISTRIBUTION SYSTEM AND RELATED TECHNIQUES

BACKGROUND OF THE INVENTION

1. Field of the Invention

The present invention relates to an analyzing method and related techniques of a power distribution system, and more particularly, to an analyzing method and related techniques of effectively analyzing couplings between power ports.

2. Description of the Prior Art

In modern society, data and videos may be transmitted, processed, and stored through electronic signals. Therefore, various electronic circuits for processing electronic signals are hardware bases of modern information society.

As known by those skilled in the art, modern electronic circuits are formed on semiconductor chips through semiconductor fabrication processes. However, mechanical properties of the semiconductor chips are fragile, and therefore, the semiconductor chips have to be appropriately packed or be adhered to appropriate encapsulated circuit boards to protect the semiconductor chips. The packaged circuit boards have signal wiring to connect the chips on the packaged circuit board to the external chips or the external circuits for being a path of the chips on the packaged circuit board to communicate with the external chips or the external circuits. Similarly, the packaged circuit board has power wiring to connect the chips of the packaged circuit board to external power such as a regulator. Therefore, the chips are able to drain required bias voltages and currents through the power wiring, which is regarded as the power distribution system of the chips.

Ideally, the power wiring of the power distribution system comprises a perfect conductor capable of completely transmitting external power to the chips. However, in fact, the power wiring has parasitic inductances and parasitic resistances, and there are electrical couplings between the power wiring also. The properties of the power distribution system for transmitting power are affected by the abovementioned non-ideal factors so that the power distribution system is not able to transmit external power completely to the chips. For example, as known by those skilled in the art, while a chip outputs time-variant electronic signals, an output driving circuit of the chip has to draw a bias current for outputting electronic signals. With variations of the electronic signals, the bias current for outputting electronic signals also varies. The power distribution system accordingly transmits a time-variant bias current to an output circuit of the chip through the power wiring according to requirements of the output driving circuit. However, while the time-variant bias current is transmitted, and while the time-variant bias current flows through the power wiring, the power wiring consumes voltage of the bias current and lowers the transmitted bias voltage because of parasitic equivalent inductances on the power wiring of the power distribution system. Thereby, the effective bias voltage received by the chip is much less than the supplied voltage from the external voltage source. Such non-ideal factors affect other bias operations in the chip and result in errors. In modern chips, since a chip processes many bits of data with a high-speed and a high-frequency clock, a large plurality of output circuits of the chip is simultaneously switched for outputting time-variant electronic signals. This leads to severe variations of a total bias current of the chip so that the voltage transmitted by the power wiring is lowered more obviously. For a power distribution system, the non-ideal factors lead to a simultaneous switching noise (SSN) of the bias voltage. For manipulating the non-ideal factors of the power distribution system, the affected degrees of the power distribution system are quantified and analyzed according to the bias voltage. Therefore, a chip designer can improve the design of the circuits of the chip and the power distribution system appropriately and add appropriate compensation circuits, such as a decoupling capacitor, for overcoming the non-ideal factors of the power distribution system.

Among prior-art power distribution system analysis methods, the bias voltage degradation caused by non-ideal factors is estimated according to the equivalent inductance of a single pad. As known by those skilled in the art, a chip has a plurality of power pads and a plurality of ground pads, and both of the plurality of pads are connected to a positive terminal and a ground terminal of the bias voltage source respectively through the power wiring of the power distribution system. Assume in a pair, including a power pad and a ground pad, which may be regarded as a set of pads or a power port, an equivalent parasitic inductance Leff is parasitic to power wiring connected to both of the pads. Therefore, when the pair of pads draws a bias current I from corresponding power wiring, a voltage degradation Vd is provided on the power wiring, and the voltage degradation Vd may be denoted as: Vd=Leff*(dI/dt). In other words, the voltage degradation Vd is proportional to a time-varying rate of the inductance of the equivalent inductance Leff to a current. When there are N sets of pads in a chip and N is a positive integer, the voltage degradation caused by the non-ideal factors of the power distribution system may be denoted as N*Leff*(dI/dt) in prior art analysis methods. In other words, in prior art power distribution system analysis methods, an equivalent inductance of a single set of pads of the power distribution system is first estimated, then the equivalent inductance is utilized for estimating a total voltage degradation of all the sets of pads of the chip caused by non-ideal factors.

However, the abovementioned analysis methods have defects. The prior art analysis methods do not take the couplings between the power wiring into considerations. In the power distribution system, except for the equivalent inductance Leff provided from a self-inductance of the wiring of single set of pads, there may also be mutual inductances and parasitic capacitances between the power wiring of various sets of pads, and this affects the properties and the performance of the power distribution system, such as the voltage degradation. In prior art analysis methods, only self-inductances of the N sets of pads are summed up for estimating the performance of the power distribution system. This is not able to concretely point out the effects caused by the mutual inductances and not able to precisely estimate the performance of the power distribution system.

SUMMARY OF THE INVENTION

The claimed invention provides a method for analyzing a power distribution system corresponding to a chip. The power distribution system connects to the chip via a plurality of pad sets. Each pad set includes a power pad and a ground pad for transmitting power provided by an external power supply to the chip through the power pad and the ground pad. The method comprises processing a single excitation analysis for obtaining an equivalent impedance corresponding to a pad set of the power distribution system, repeating the single excitation analysis for obtaining equivalent impedances of at least two pad sets of the power distribution system in a condition of single excitation, comparing the obtained equivalent impedances of the pad sets in the condition of single excitation to choose a worst pad set, and processing a simultaneous switching noise (SSN) analysis and calculating an equivalent impedance of the worst pad set during simultaneous switching of a plurality of driving circuits of the chip.

The claimed invention provides a method of power distribution system analysis for analyzing the power distribution system corresponding to a chip. The power distribution system comprises a plurality of power ports connected to the chip for transmitting a bias voltage and a current to the chip. The method comprises processing a simultaneous switching noise (SSN) analysis, which comprises choosing a plurality of conducting power ports of the power distribution system, and simultaneously making those conducting power ports transmit currents for driving a plurality of driving circuits of the chip, wherein each conducting power port has a current, evaluating a voltage capable of being transmitted by a given power port, and calculating an equivalent impedance of a given power port in a simultaneous switch of the driving circuits according to the current of each conducting power port and a measured voltage of the given power port.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
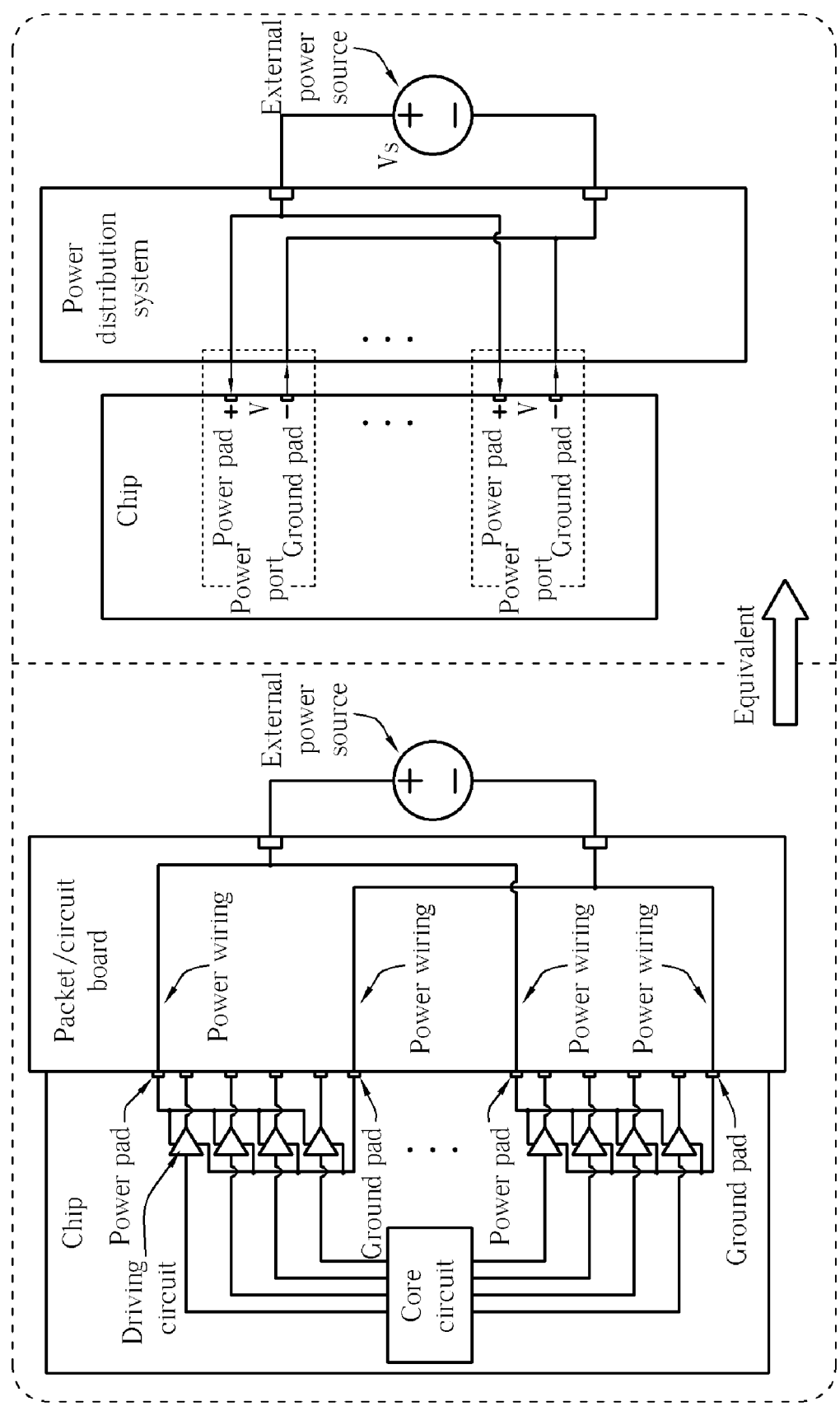
FIG. 1 is a diagram of a power distribution system and a packaged circuit board corresponding to a chip.

Please refer to FIG. 1, which is a diagram of a power distribution system and a packaged circuit board corresponding to a chip. As shown in the left side of FIG. 1, the chip is disposed above the packaged circuit board, and the chip has a plurality of power pads and a plurality of ground pads. The plurality of power pads and the plurality of ground pads are connected to the power wiring of the packaged circuit board for transmitting the external supplied power, such as the power provided from a regulator or a power port on a circuit board, to the chip for supplying a required bias current and a required bias voltage.

In actual applications, pads of a chip may be connected to traces on a packaged circuit board through bonding wires, and the traces are connected to packaged conductive pins so that the pads are connected to an external power through the pins. The combination of the bonding wires, the traces, and the pins is regarded as the power wiring shown in FIG. 1. Moreover, certain integrated circuits are packaged with flip chips. The pads of the chip are connected to a front side of the packaged circuit board through bumps, and are connected to conductive balls on a reverse side of the packaged circuit board through an internal connection layer inside the packaged circuit board. The combination of the conductive balls, the internal connection layer, and the bumps is regarded as the power wiring of the packaged circuit board. Besides, the packaged circuit board, the power wiring may also include routings on the packaged circuit board. For example, after the chip is packaged in an integrated circuit, the chip should be connected to the packaged circuit board or to the motherboard for connecting to a regulator regarded as an external power source through the packaged circuit board or the motherboard. For a complete design of a bias voltage ransmitting path, the routings on the packaged circuit board or the motherboard may also be included in the power wiring shown in FIG. 1.

For simulating the power wiring disposed between the chip and the external power source, a power distribution system profile may be utilized for describing the packaged board or the circuit board corresponding to the chip, as shown in the right side of FIG. 1. The connections (e.g., power pad, ground pad) between the packaged circuit board and the chip are regarded as power ports of the power distribution system. Each power port corresponds to a pair of pads including a power pad and a ground pad. In other words, the power distribution system may be utilized for integrating the power wiring and the electrical couplings in the packaged circuit board. The chip draws a required bias voltage and a required bias current from an external power source through the power distribution system. As a result, one goal of the present invention is to propose a systematic analysis procedure to precisely analyze the power distribution system of a chip in quality and quantity. The procedure can help chip designers understand the characteristics of a power distribution system, and the procedure can also help manufacturers of packaged circuit boards improve the designs of packaged circuit boards to reduce the power supply noise induced by non-ideal factors in a power distribution system.

Figure 2:
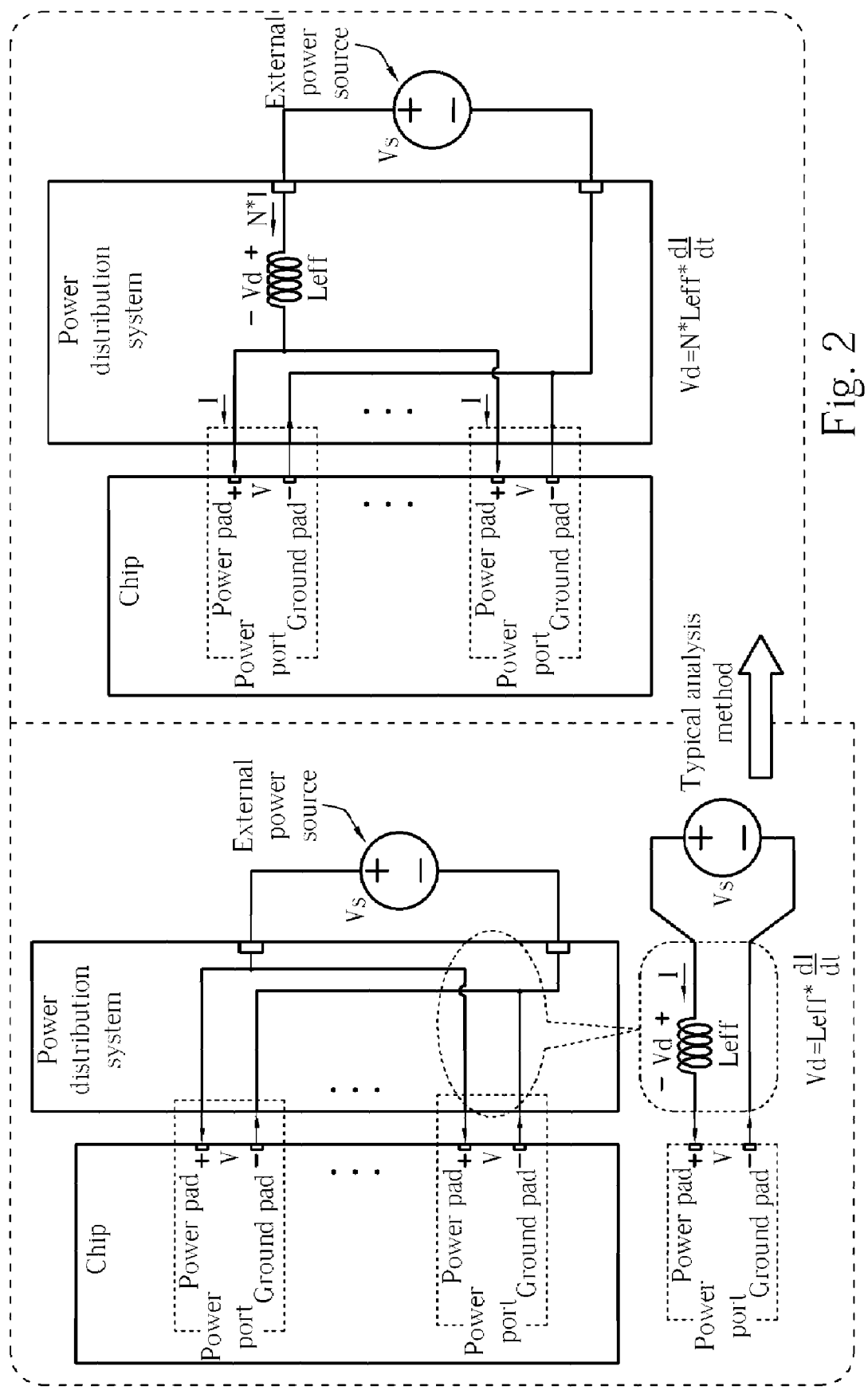
FIG. 2 is a diagram for illustrating the typical method of analyzing a power distribution system.

Please refer to FIG. 2, which is a diagram for illustrating a typical method of analyzing a power distribution system. For analyzing the voltage degradation caused by the non-ideal factors of the power distribution system such as parasitic inductances of the power wiring, performance of a single power port is utilized for estimating the performances of all the power ports of the power distribution system in the prior art. When there is an equivalent parasitic inductance having a parasitic inductance Leff between a single power port and an external power source, and when the power port transmits a bias current I as shown in FIG. 2, there would be a voltage degradation Vd ($Vd = Leff \cdot dI/dt$) on the equivalent parasitic inductance Leff. Therefore, the bias voltage V, which is the actual voltage transmitted to the chip as shown in FIG. 2, merely equals Vs−Vd other than the voltage Vs supplied from the external power source.

While estimating a whole performance of the power distribution system, performance of a single power port is utilized for analyzing the whole performance in a typical method of FIG. 2. When N power ports transmit the bias current I simultaneously in the power distribution system, Vd (Vd=N*Leff*dI/dt), is regarded as the whole voltage degradation of the power distribution system caused by the non-ideal factors of the power distribution system in the prior art.

However, there are also defects in the typical analyzing method of FIG. 2. One primary defect is that the mutual couplings between various power ports are ignored. Between various power wirings of the power distribution system, electrical couplings exist and essentially affect the whole performance of the power distribution system, and thereby, the electrical couplings cannot be ignored. As a result, one of the main objects of the present invention is to propose a better systematic analysis procedure to efficiently reflect the situation of mutual couplings between various power ports in a power distribution system.

Figure 3:
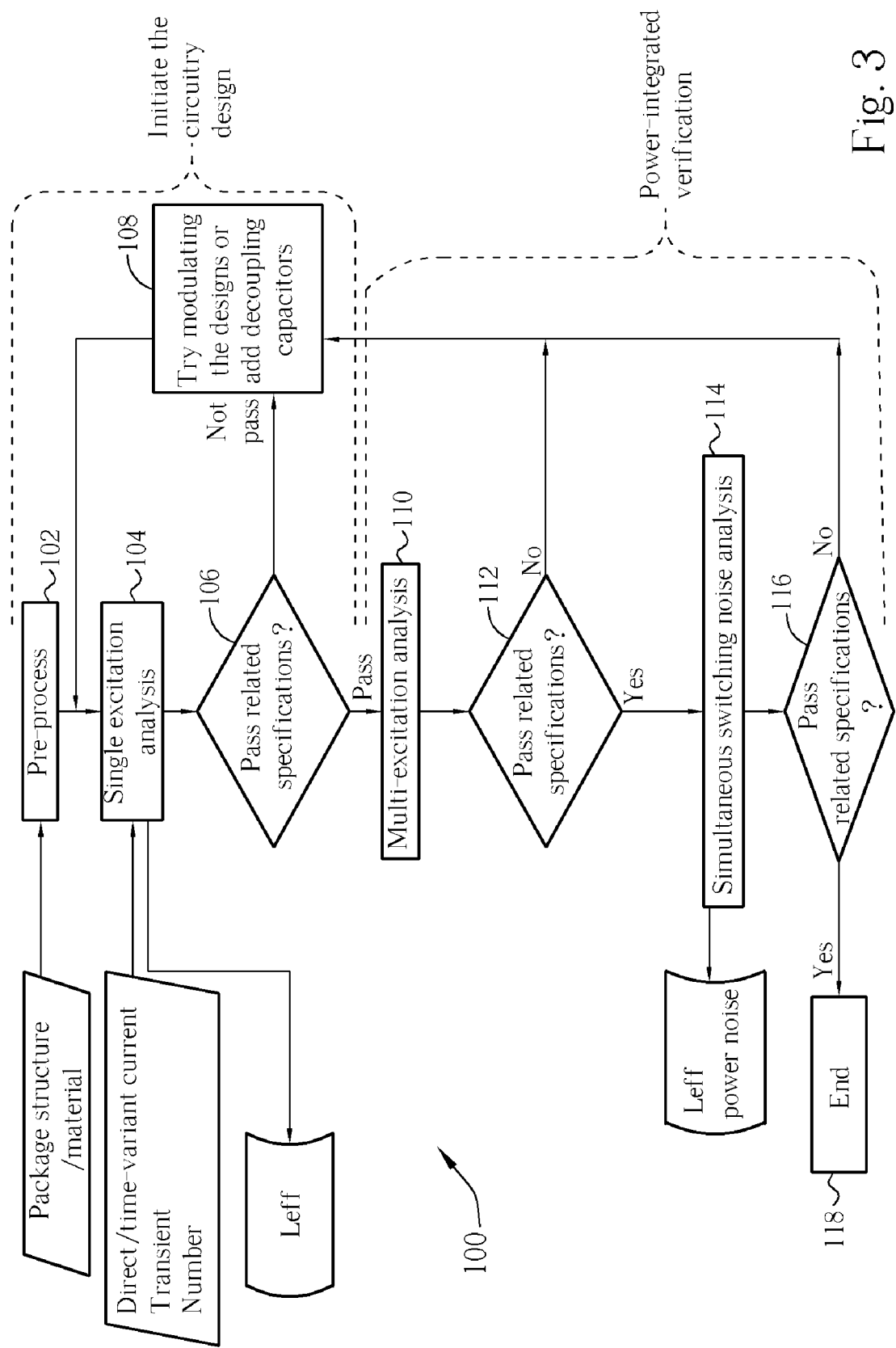
FIG. 3 is a diagram of a procedure illustrating the systematic analyzing method of the present invention.
Figure 4:
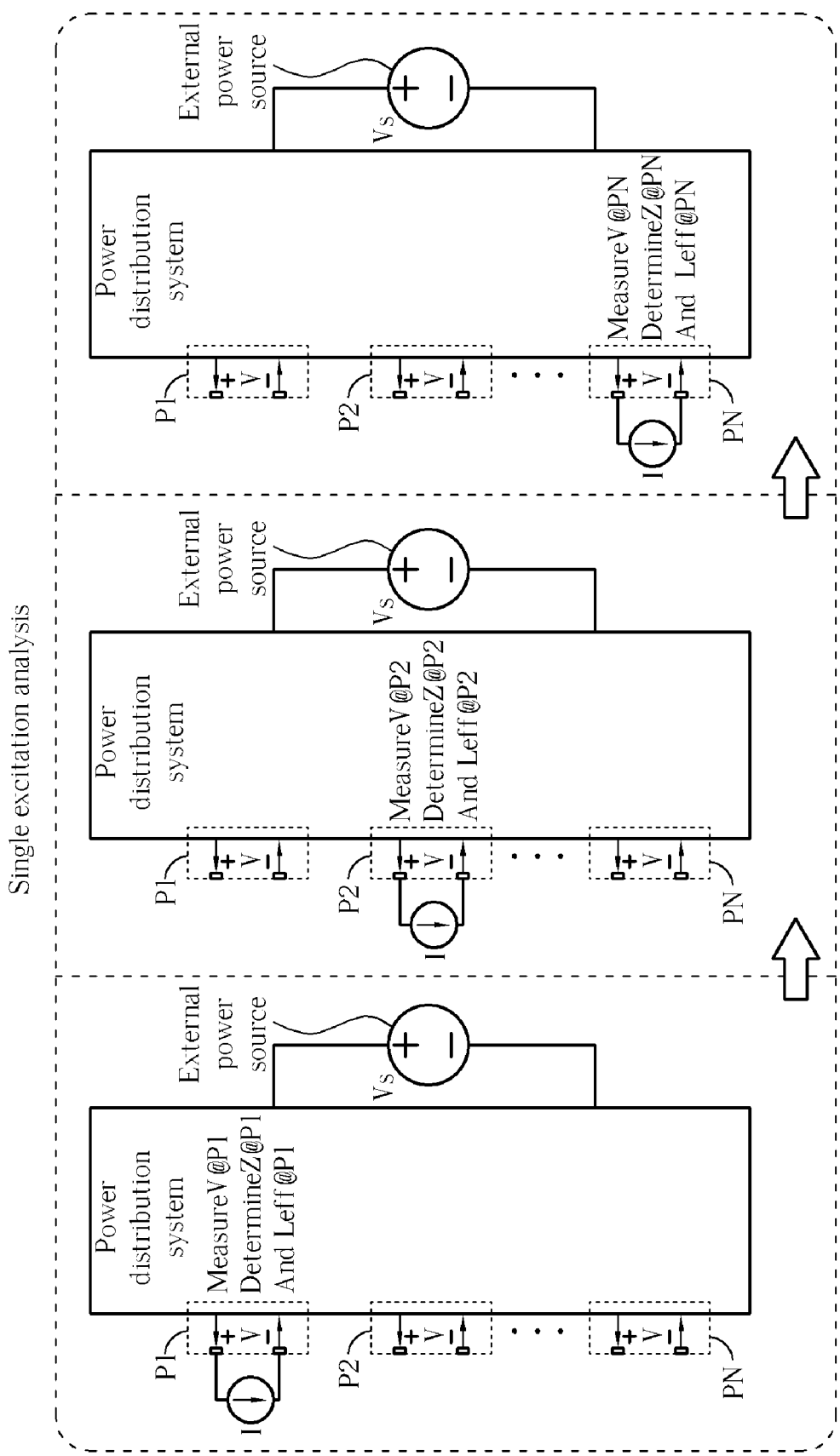
FIG. 4 is a diagram of executing a single excitation analysis mentioned in step 104 shown in FIG. 3.
Figure 5:
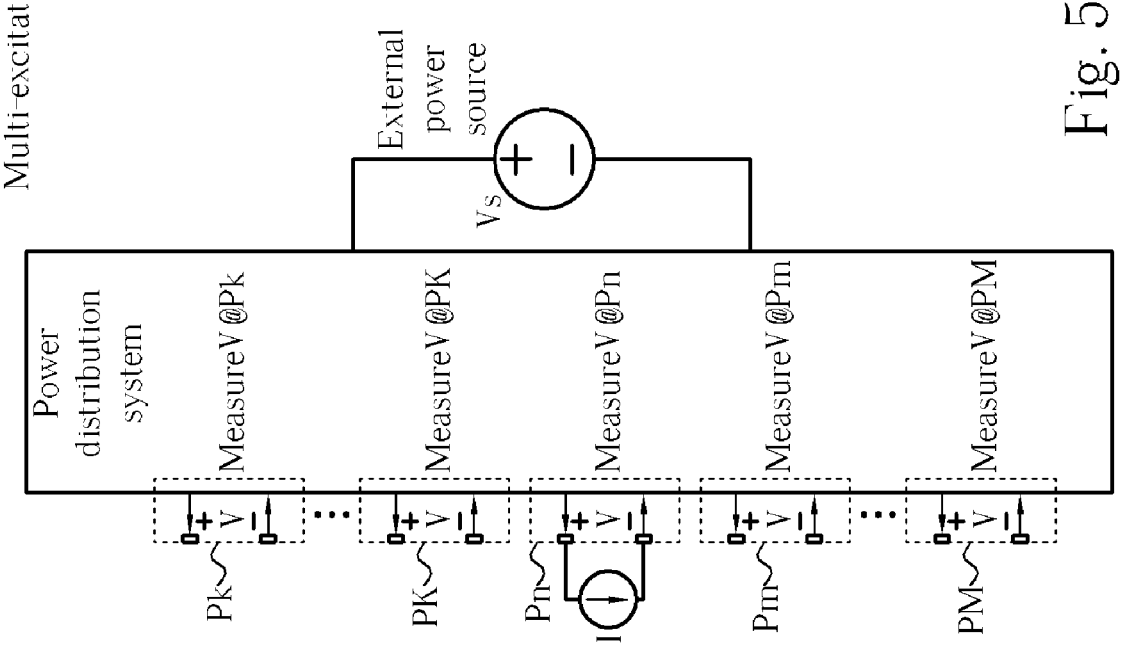
FIG. 5 is a diagram of executing a multi-excitation analysis mentioned in step 110 shown in FIG. 3.
Figure 6:
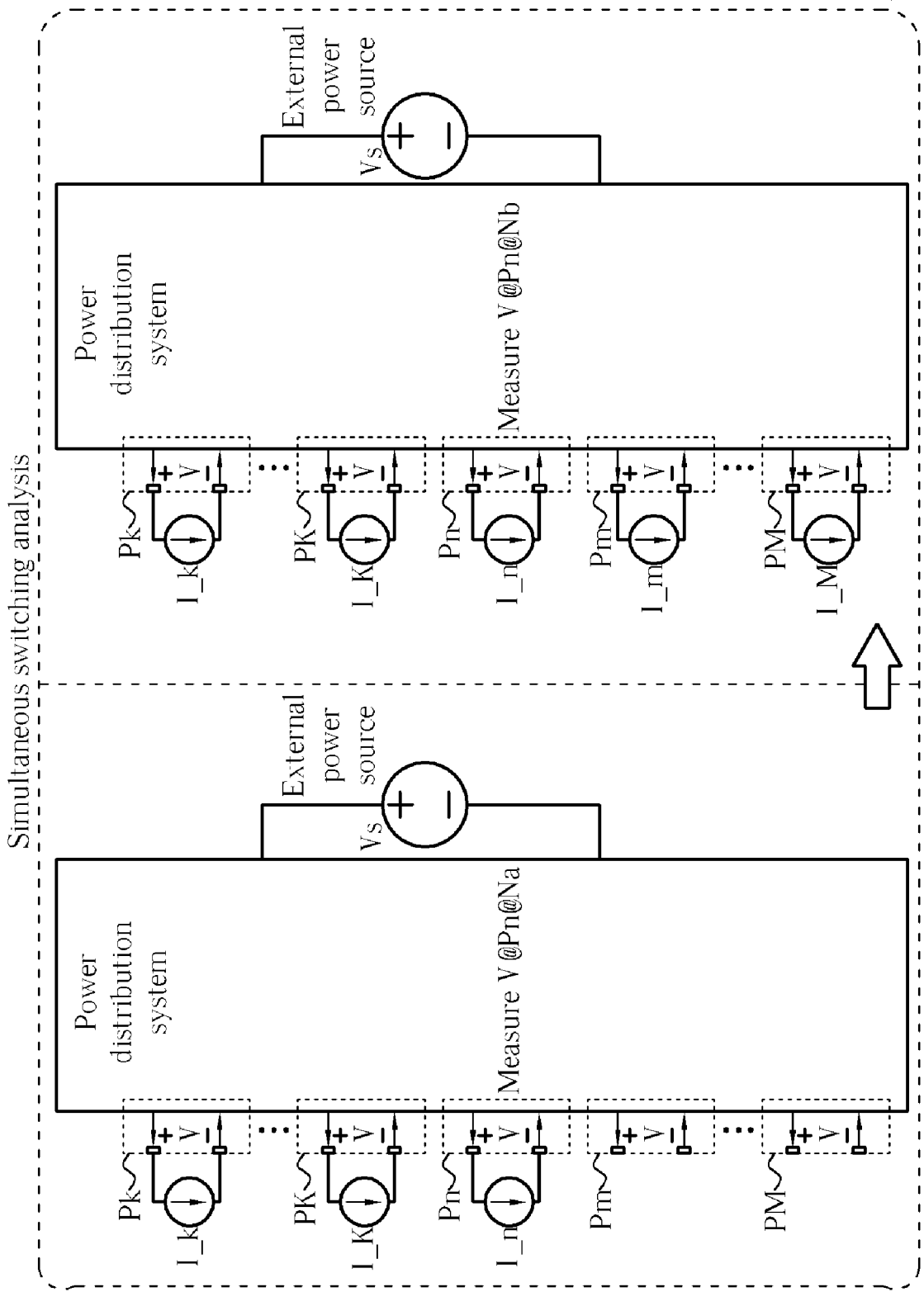
FIG. 6 is a diagram of executing the simultaneous switching noise analysis in step 114 shown in FIG. 3.

Please refer to FIG. 3, FIG. 4, FIG. 5, and FIG. 6. FIG. 3 is a diagram of a procedure 100 illustrating the systematic analyzing method of the present invention. FIG. 4, FIG. 5, and FIG. 6 illustrate the details of main steps of the procedure 100. In a preferred embodiment of the present invention, the analyzing method of the present invention is implemented with numerical simulation techniques for assisting the designer in quantifying the properties of the power distribution system, and in simulating the non-ideal factors of the power distribution system. As shown in FIG. 3, the procedure 100 of the present invention comprises:

Step 102: It is a pre-process. After the design of the packaged circuit board is completed, a circuit model of a power distribution system may be first established according to corresponding package structures and materials. For example, the performance and the properties of the power distribution system are affected by conductive materials for constructing the power wiring, the geometric disposition, the lengths, the widths of the power wiring, and the distances between the power wiring. In step 102, the circuit model of the power distribution system is established according to the parameters for later analyses.

Step 104: Perform the single excitation analysis. In the single excitation analysis of the present invention and for each power port of the power distribution system, a power port is made to conduct a given current one time, and a voltage, which may be provided by the power port, is measured for calculating a parasitic equivalent impedance and an equivalent inductance of the power port according to a bias voltage and a corresponding current which are transmitted by the power port. Please refer to FIG. 4, which is a diagram of executing a single excitation analysis mentioned in step 104 shown in FIG. 3 of the present invention.

As shown in FIG. 4, when the single excitation analysis on power ports P1, P2, . . . , PN is executed, the power port P1 is first conducted with a given current I (by a given current source), and a voltage V, which is denoted as V@P1 in FIG. 4 and provided between the power pad and the ground pad by the power port P1, is measured; at the same time, the other power ports are not conducted and remain a floating status or a high impedance. Then, a parasitic equivalent impedance Z and an equivalent inductance Leff of the power port P1 are determined according to the comparison between a voltage V@P1 and an external source voltage Vs and the magnitude of the current I. (In FIG. 4, Z@P1 and Leff@P1 respectively stand for a parasitic equivalent impedance Z and an equivalent inductance Leff of the power port P1.)

Then, the power port P2 is conducted with the given current I. A parasitic equivalent impedance Z@P2 and an equivalent inductance Leff@P2 of the power port P2 are also determined according to a voltage V@P2 provided by the power port P2. At the same time, the other power ports including the power port P1 are not conducted. Similarly, when the power port PN is conducted with the given current I whereas the other power ports are not conducted, a parasitic equivalent impedance Z@PN and an equivalent inductance Leff@PN of the power port PN are determined according to a voltage V@PN provided by the power port PN and the current I. Therefore, the single excitation of the power ports P1, P2, . . . , PN is finished.

DC currents or AC time-variant currents may be utilized to evaluate impedance properties of each of the power ports respectively while the single excitation analysis is executed. When a power port is conducted with a given DC current (i.e., the external source voltage Vs is a DC voltage source), a resistive impedance of the power port may be determined. When a power port is conducted with a resonant AC current having a given frequency and a given amplitude of vibration (i.e., the external source voltage Vs is a resonant AC voltage source), an inductive impedance of the power port under the given frequency may also be determined. A power port may also be conducted with a current having a given time-domain waveform, for example, a current having impulses, steps, or periodical square waves, for analyzing the effect of the parasitic equivalent impedance of the power port on the time domain and the transient effect on voltages.

The single excitation analysis may be executed on all power ports of the power distribution system one by one or a specific set of power ports of the power distribution system. Therefore, the single excitation analysis of the present invention may be applied to these specific power ports. For example, if there are 100 power ports in the power distribution system, the single excitation analysis may be executed on merely 10 representative power ports of the 100 power ports. In summary, after the single excitation analysis mentioned in step 104, the properties of each of the power ports of the power distribution system should be determined, and the parasitic equivalent impedances and the equivalent inductances Leff of each power port may thus be determined.

Step 106: After the single excitation analysis of a plurality of power ports in step 104, a power port having a worst performance according to the equivalent impedances and the equivalent inductances of all the power ports may be found. As a result, a worst situation of the power distribution system is also found. For example, the parasitic inductances of each power port may be sorted. If some power port has the highest equivalent inductance, this power port may be considered the worst power port. Because this power port has the highest inductance, when this power port is conducted, the highest voltage drop would happen at the voltage provided by some outside power source. Consequently, there exist the highest bias and noise between the bias voltage provided by this power port and the voltage of the outside power source. Then, after the worst power port is found, the performance of this worst power would be reviewed to see if relative specifications are fulfilled. For instance, some electrical specifications of a chip package would set an upper level of the parasitic inductances of each power port; specifications of some chips may regulate an upper level of the biasing noise and the error rate that the chips can tolerate. When the performance of the worst power port may pass related specifications, go to step 110; else, go to step 108.

Step 108: Try to revise the designs of the packaged circuit board, or add decoupling capacitors to appropriate power ports for enhancing the performance of the worst power port. Then go to step 104 for executing the single excitation analysis on the improved power distribution system.

Step 110: If the procedure goes from step 104 and step 106 to step 110, it means that the initiative circuit design is finished. As a result, starting from step 110, we may analyze the couplings between the power ports and evaluate the whole performance of the power distribution system to process a power-integrated verification. In step 110, a multi-excitation analysis is executed first. While a multi-excitation analysis on a given power port is executed, the given power port is conducted whereas the other power ports are not conducted. A bias voltage provided by the given power port and the other power ports is measured for quantifying the couplings between the given power port and the other power ports. The process for executing step 110 is further illustrated in FIG. 5. The FIG. 5 illustrates the procedure of a multi-excitation analysis of the present invention.

As shown in FIG. 5, while the multi-excitation analysis on a given power port Pn is executed, the power port Pn is conducted with a given current I, which may be provided from a given current source, and the voltages, which are denoted as V@Pk, ..., V@PK, V@Pn, V@Pm, ..., V@PM and respectively provided by the power ports Pk, ..., PK, Pn, Pm, ..., PM as shown in FIG. 5, are measured simultaneously. Therefore, the mutual couplings between the power ports are quantified. For example, while the multi-excitation analysis is executed, if the voltage of a specific power port is close to the voltage of the given power port Pn, the specific power port has a high mutual coupling with the given power port Pn, and the performances of the specific power port and the given power port Pn are, therefore, highly related by the high mutual coupling. Similarly, if the voltage of the specific power port is not close to the voltage of the given power port Pn, the specific power port has a low mutual coupling with the given power port Pn, and the performances of the specific power port and the given power port Pn are, therefore, less related.

Similar to the single excitation analysis, during the multi-excitation analysis, the given current source may be made to conduct a DC current or an AC time-variant current to analyze the mutual couplings between the power ports under various circumstances. In a preferred embodiment of the present invention, a worst power port is assigned as the given power port in the multi-excitation analysis to analyze the mutual couplings of the worst power port with the other power ports. Besides assigning the given power port, a plurality of representative power ports of all the power ports of a power distribution system may also be assigned for executing the multi-excitation analysis. It is not necessary to measure all power port voltages. For example, when there are 100 power ports in the power distribution system, nine representative power ports of the 100 power ports may be assigned for analyzing the mutual couplings of the given power port with the nine representative power ports.

Step 112: After the multi-excitation analysis in step 110, the results of executing the multi-excitation analysis are utilized for determining whether the performance of the power distribution system fulfills related specifications. If the performance of the power distribution system passes the related specifications, go to step 114; else, go to step 108.

Step 114: Execute a simultaneous switching noise (SSN) analysis. As mentioned above, when a plurality of output driving circuits of a chip drains a bias current from a plurality of power ports simultaneously, a simultaneous switching noise in the bias voltage may occur since the bias current of the power distribution system varies significantly in a extremely short time. Therefore, during the simultaneous switching noise analysis, a plurality of power ports is conducted simultaneously, and the voltage of a given power port is then measured for simulating the performance of the given power port under the simultaneous switching noise analysis. For simulating different combinations of simultaneous switching, various combinations of other power ports may also be conducted while the given power port is still conducted for analyzing the performance of the given power port under various combinations of simultaneous switching. The process of executing step 114 is illustrated in FIG. 6. FIG. 6 shows the procedure of a simultaneous switching analysis of the present invention.

While the simultaneous switching analysis on a given power port Pn conducted with a current I_n is executed, a plurality of power ports Pk, ..., PK is conducted with given currents I_k, ..., I_K respectively whereas the remaining power ports are not conducted, and a voltage V provided by the given power port Pn is measured, where in FIG. 6, the voltage V is labeled as V@Pn@Na and Na stands for the total current that the power port Pn is conducted with. According to the voltage V and a total current conducted in the power distribution system, an equivalent impedance and an equivalent inductance of the given power port Pn in the Na simultaneous switching condition can be determined. Besides, the number of conducting power ports may also be changed for simulating various simultaneous switching conditions. For example, in addition to the previous conducting power ports Pk, ..., PK, the additional power ports Pm, ..., PM may also be conducted with currents I_m, ..., I_M respectively to measure a voltage V@Pn@Nb provided by the given power port Pn, where in FIG. 6, the voltage V is labeled as V@Pn@Nb and Nb stands for the total current that the power port Pn is conducted with. Therefore, a parasitic equivalent impedance and an equivalent inductance of the given power port Pn in the Nb simultaneous switching condition are determined. Note that there is a plurality of power ports conducted with currents, and thereby, the determined equivalent impedances and the determined equivalent inductances may effectively quantify the mutual couplings between the power ports for quantifying properties and performance of the power distribution system more precisely under simultaneous switching noise. In a preferred embodiment of the present invention, the given power port Pn may be the worst power port determined in step 106.

Similar with the aforementioned single excitation analysis and the aforementioned multi-excitation analysis, during the simultaneous switching noise analysis, the currents for conducting each power port may be DC or AC. While the simultaneous switching analysis is executed, power ports that should be conducted may be decided according to how the chip works, and the magnitude of current for conducting a power port may also be determined to model the simultaneous switching noise more precisely. For example, in a power distribution system, each power port is assumed to provide bias currents to four driving circuits of a chip, and each driving circuit drains a bias current Id while being driven. Therefore, while the simulation the simultaneous switching of three specific driving circuits is executed, one of the driving circuits may be conducted with a current of a magnitude 3*Id whereas the other two power ports are not conducted. As a result, an equivalent impedance and an equivalent inductance of one power port under simultaneous switching are determined according to a voltage provided by this power port. Similarly, while the simulation of eight driving circuits under simultaneous switching is executed, two of these eight power ports may be conducted with a current of a magnitude of 4*Id respectively to determine the equivalent impedances and the equivalent inductances of both the power ports and to analyze the effects of the eight driving circuits on the power distribution system under simultaneous switching. By the similar way, while the simulation of 32 specific driving circuits under simultaneous switching is executed, eight of these power ports are conducted with a current of a magnitude 4*Id respectively, and the effects of the 32 specific driving circuits under simultaneous switching is analyzed according to a voltage provided by any given power port.

Summarize what is described in step 114. While a simultaneous switching analysis in the present invention is executed, the mutual couplings between the power ports are quantified more precisely under the simultaneous switching noise analysis. That is, while the simultaneous switching noise analysis is executed, the mutual couplings between the power ports are better quantified in the present invention. Various equivalent impedances and various equivalent inductances for different types of simultaneous switching are also determined. The chip designer may choose a proper equivalent inductance according to how the chip works, such as the simultaneous switching of a plurality of driving circuits, for more precisely simulating how the power distribution system affects the chip under simultaneous switching.

Step 116: After the simultaneous switching noise analysis in step 114, determine whether the performance of the power distribution system passes the related specifications again. If the performance of the power distribution system passes the related specifications, go to step 118; else, go to step 108.

Step 118: The power integrated verification of the packaged circuit board is completed.

In the procedure 100, the order of executing the multi-excitation analysis in step 110 and the simultaneous switching noise analysis in step 114 does not necessarily obey the order shown in FIG. 3. The order of executing both analyses with respect to the order shown in FIG. 3 may be exchanged. Or both analyses may be executed in parallel. In a preferred embodiment of the present invention, the procedure 100 is executed through numeric simulation. That is, during the single excitation analysis or multi-excitation analysis or simultaneous switching noise analysis, as a voltage provided by a specific power port is measured, the voltage would be determined through the numeric simulation. However, the procedure 100 in FIG. 3 may also be executed over a real power distribution system, that is, by conducting the power ports with a real current source, such as a function generator, and measuring the voltages provided by the power ports respectively with instruments such as a voltage meter, an oscilloscope, or a network analyzer. Additionally, control hardware or firmware may also be built in a chip for analyzing. When the chip is packaged for forming an integrated circuit, the chip inside the integrated circuits may still be utilized for determining which power ports are conducted or not to execute the aforementioned analyses.

Figure 7:
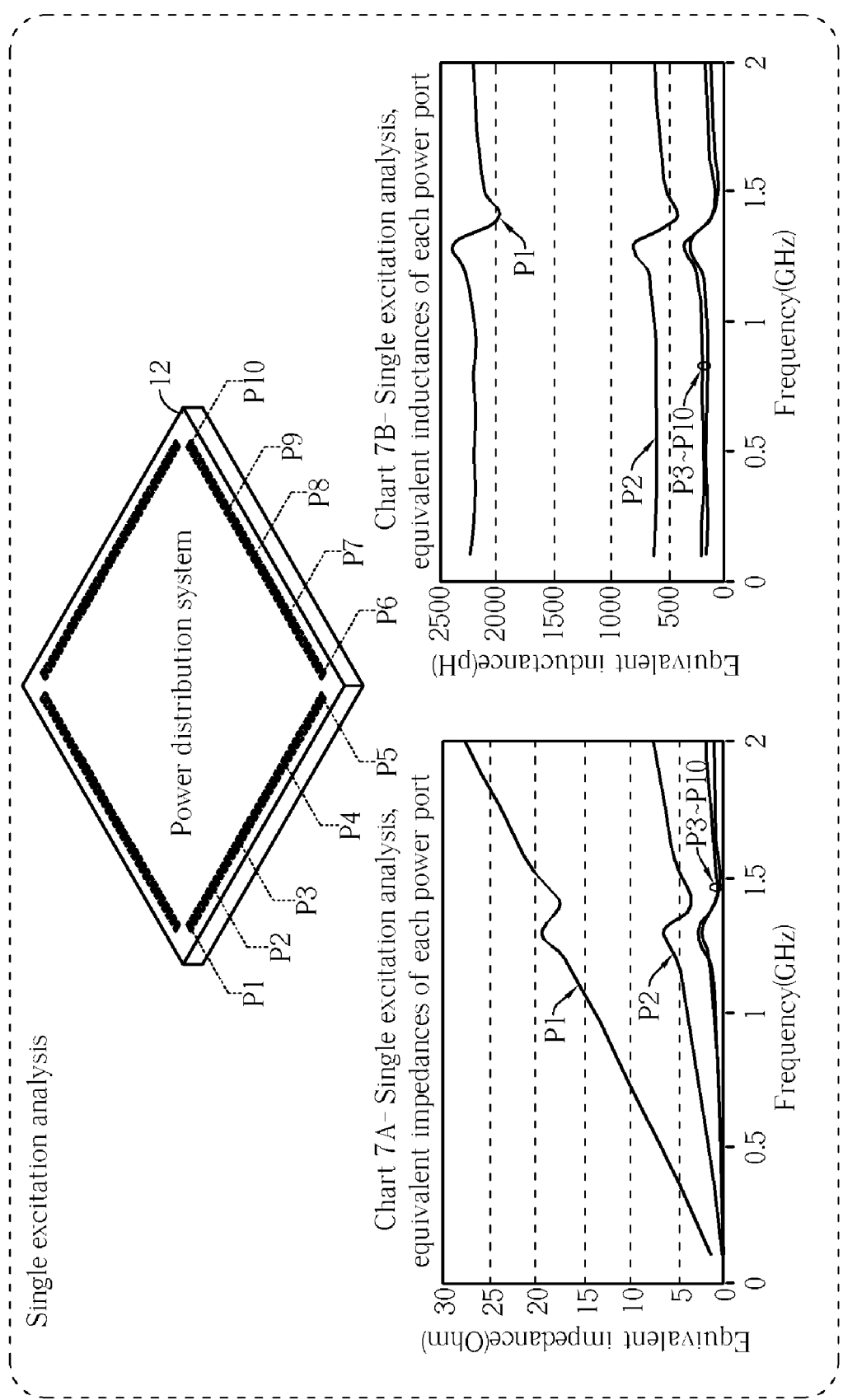
FIG. 7 is a diagram illustrating statistics and charts while executing the single excitation analysis on a power distribution system in the present invention.
Figure 8:
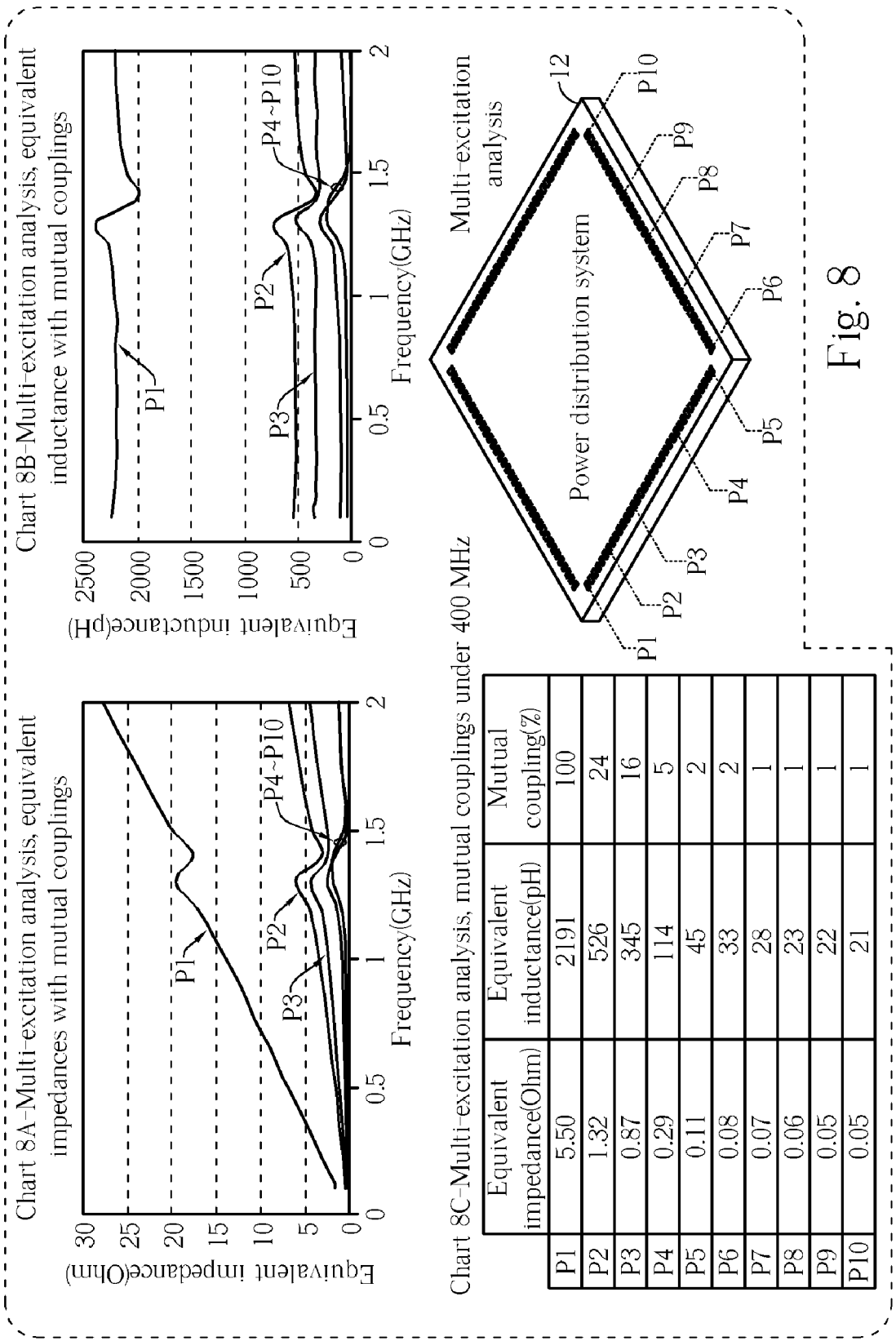
FIG. 8 is a diagram illustrating statistics and charts while executing the multi-excitation analysis on a power distribution system in the present invention.
Figure 9:
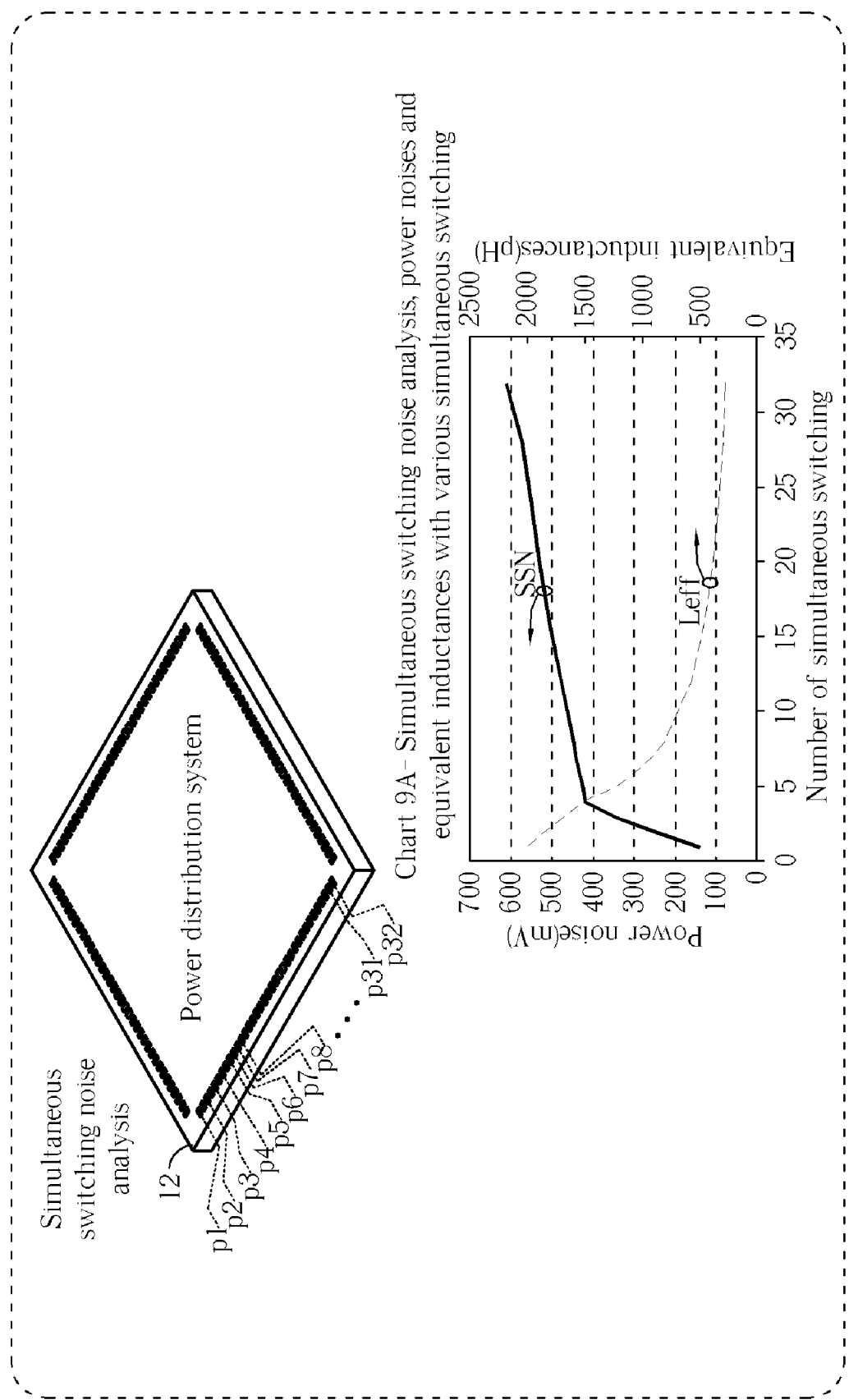
FIG. 9 and FIG. 10 are diagrams illustrating statistics and charts while executing the simultaneous switching noise analysis on the power distribution system in the present invention.
Figure 10:
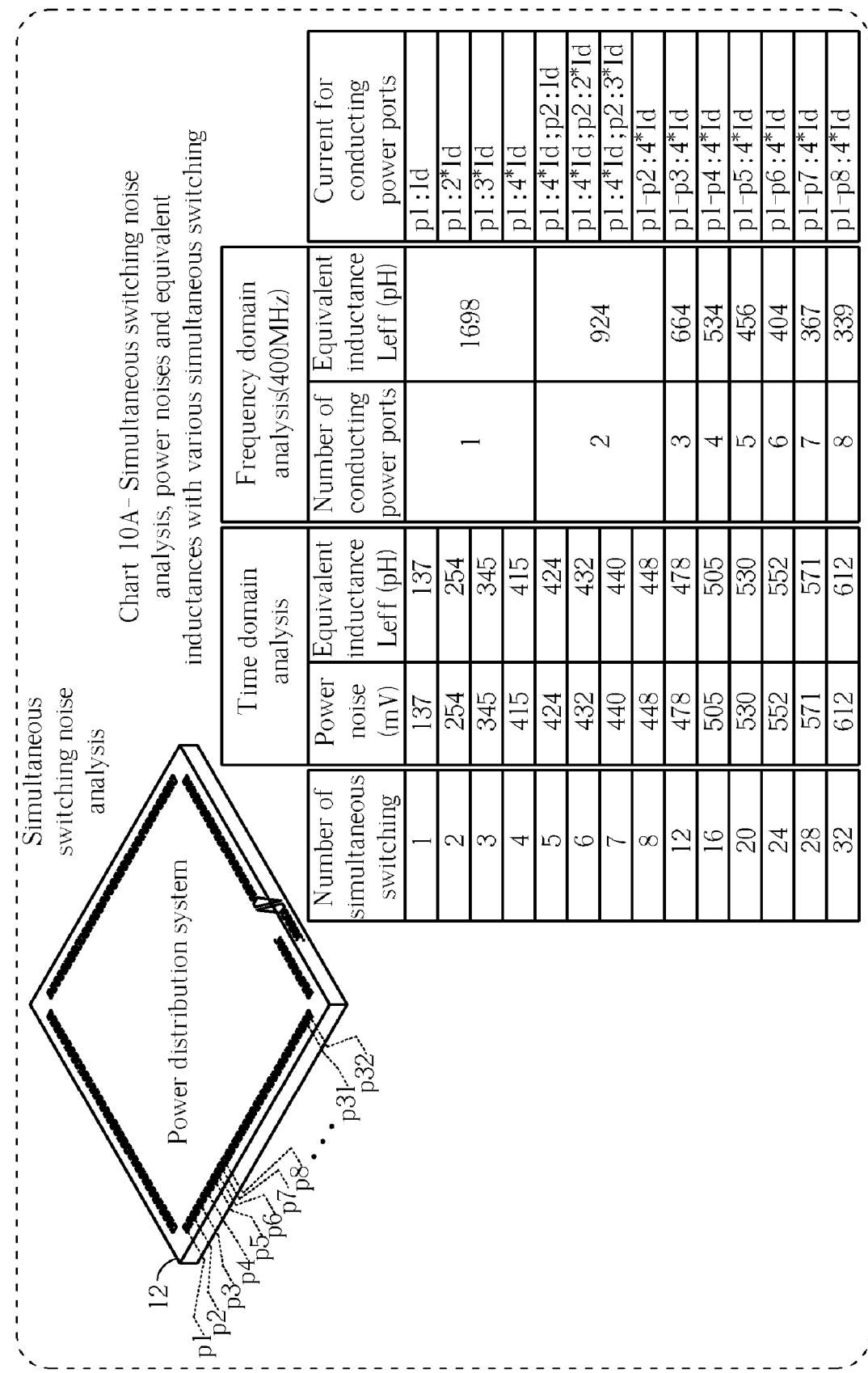

For further describing how the aforementioned analyses of the procedure 100 work, actual statistics acquired by the present invention are utilized for describing how the single excitation analysis, the multi-excitation analysis, and the simultaneous switching noise analysis work while a packaged circuit board of a given type is analyzed in the present invention. The statistics are also used for describing how the results of the analyses help the chip designer evaluate a power distribution system. Please refer to FIG. 7, FIG. 8, FIG. 9, and FIG. 10, which illustrate related statistics while executing the procedure 100 on a packaged circuit board of a given type. The packaged circuit board of the given type is considered a power distribution system 12. FIG. 7 is a diagram illustrating statistics and charts during executing the single excitation analysis on the power distribution system 12 of the present invention. FIG. 8 is a diagram illustrating statistics and charts during executing the multi-excitation analysis on the power distribution system 12 of the present invention. FIG. 9 and FIG. 10 are diagrams illustrating statistics and charts during executing the simultaneous switching noise analysis on the power distribution system 12.

As shown in FIG. 7, the power distribution system 12 is formed from a packaged circuit board of a given type. The power distribution system 12 has a plurality of power ports along edges of the packaged circuit board. While the single excitation analysis is executed on the power distribution system 12, select ten power ports P1, P2, . . . , P10 among those power ports along the two sides of the packaged circuit board, and apply the single excitation analysis as shown in FIG. 4 to these selected power ports. That is, while the single excitation analysis is implanted, the power port P1 may be the first to be conducted with a current whereas the other power ports are not conducted, and a voltage provided by the power port P1 is thus measured and incorporated with an external voltage source to determine a voltage drop at the power port P1 in power distribution system 12. Then, a parasitic equivalent impedance and an equivalent inductance of the power port P1 are determined according to the voltage degradation and the current for conducting the power port P1. Accordingly, the power port P2 is later conducted with a current whereas the remaining power ports including the power port P1 are not conducted, and an equivalent impedance and an equivalent inductance of the power port P2 are determined according to a voltage provided by the power port P2 and the external voltage source. The single excitation analysis is then executed on the other power ports in order. Lastly, the equivalent impedances and the equivalent inductances of the power ports P1, P2, . . . , P10 are determined one by one.

More specifically speaking, while the single excitation analysis on a specific power port is executed, the power port is conducted with a resonant time-variant current of a given frequency. If a voltage degradation Vd of the power port is provided when the time-variant current flows, an equivalent impedance $Z(w)$ ($Z(w)=Vd(w)/I(w)$) of the power port under the given frequency is determined, wherein w denotes an angular velocity, $Vd(w)$ denotes the voltage degradation provided by the power port under the frequency domain, and $I(w)$ denotes the current applied by the power port under the frequency domain. Generally speaking, the equivalent impedance $Z(w)$ is primarily an inductive impedance, and thereby, under the frequency domain, the equivalent inductance $Leff(w)$ may be determined by $Z(w)=j*w*Leff(w)$, wherein j denotes the square root of −1 in complex numbers. The equivalent impedance and the equivalent inductance of the given power port under various frequencies may be determined by adapting the frequency of the resonant time-variant current. In FIG. 7, the charts 7A and 7B illustrate respectively the variation of the equivalent impedances and the equivalent inductances of the power ports under the single excitation analysis. The horizontal axes of the charts 7A and 7B represent the frequency, which takes GHz (Gigahertz) as its unit. The vertical axis of the chart 7A represents the impedance, which takes Ohms as its unit. The vertical axis of the chart 7 represents the inductance, which takes pH (pico-Henry) as its unit. As shown in the chart 7A, under the single excitation analysis, the equivalent impedances of the power ports reveal an inductive high-pass trend. Thereby, as shown in the chart 7A, the equivalent impedance of the power port P1 is the highest, and the equivalent impedance of the power port P2 is next to the highest. The equivalent impedances of the power ports P3, P4, ..., P10 are close to each other. After the equivalent inductances in the chart 7B is determined by the determined equivalent impedances in the chart 7A, it can be seen that the equivalent inductances of the power ports are almost constants, i.e., the equivalent inductances of the power ports do not vary with the frequency. As shown in the chart 7B, the equivalent inductance of the power port P1 is the highest, the equivalent inductance of the power port P2 is next to the highest, and the equivalent inductances of the power ports P3, P4, ..., P10 are close to each other.

After the charts 7A and 7B in FIG. 7 are produced by executing the single excitation analysis on the power ports P1, P2, ..., P10 of the power distribution system 12, it is can be seen that the equivalent impedance and the equivalent inductance of the power port P1 are both the highest among all the power ports. That is, while transporting power from an external voltage source, the power port P1 has the highest voltage degradation among all the power ports. In other words, and following the step 106 of the procedure 100 shown in FIG. 3, the power port P1 is a worst power port. Through the single excitation analysis, the chip designer may find out the worst power port, and may make some improvements to the power distribution system according to the worst power port for enhancing the properties of the power distribution system.

Please refer to FIG. 8 following FIG. 7 also. As shown in FIG. 8, the power ports P1, P2, ..., P10 utilized in FIG. 7 are also utilized in FIG. 8 for executing the multi-excitation analysis shown in FIG. 5. While the multi-excitation analysis executed, the worst power port P1 is taken as a given power port. Thereby, the power port P1 is conducted with a current whereas the other power ports are not conducted, and the voltages provided by the power ports P1, P2, ..., P10 are measured. The multi-excitation analysis is utilized for quantifying the mutual couplings of the power port P1 with the other power ports P2, P3, ..., P10. Even if the power ports P2, P3, ..., P10 are not conducted, there are voltages provided from the power ports P2, P3, ..., P10 and resulting from the respective mutual couplings with the power port P1. Thereby, the mutual couplings of the power port P1 with the other power ports P2, P3, ..., P10 can be quantified by measuring the voltages provided by the power ports P2, P3, ..., P10. According to the voltages provided by the power ports P2, P3, ..., P10 and the current of the power port P1, the equivalent impedances and the equivalent inductances of the power ports P2, P3, ..., P10 caused by mutual couplings are determined. In FIG. 8, the charts 8A and 8B respectively illustrate the equivalent impedances and the equivalent inductances of the power ports having mutual coupling. The horizontal axes of the charts 8A and 8B represent "frequency," the vertical axis of the chart 8A represent impedance, and the vertical axis of the chart 8B represent inductance. Besides, the chart 8C illustrates the mutual couplings of the power ports under a frequency of 400 MHz. As shown in the chart 8C, a self-inductance of the power port P1 is regarded as the standard inductance, i.e. 100 percent, and thereby, the mutual coupling between the power ports P1 and P2 is 24 percent, and the mutual coupling between the power ports P1 and P3 is 16 percent.

Among the power ports P2, P3, ..., P10, the mutual coupling between the power ports P2 and P1 is the highest, and this may be because the relative position between the power ports P2 and P1 is the closest or because the power wiring of the power ports P1 and P2 have a higher electrical coupling or a higher geometric relation. That is, the properties of the power port P2 are affected by the power port P1 to a specific degree. Moreover, since the power port P1 is the worst power port, it would affect the power port P2 in a worse aspect. Oppositely, when the properties of the power port P1 are improved, the properties of the power port P2 may also be improved.

Please refer to FIG. 9 and FIG. 10 that follow FIG. 7 and FIG. 8. In FIG. 9 and FIG. 10, power ports p1, p2, ..., p32 at one side of the packaged circuit board are analyzed for executing the simultaneous switching noise analysis on the power ports p1, p2, ..., p32. In the simultaneous switching noise analysis, various amounts of power ports are conducted with currents simultaneously for simulating various circumstances of simultaneous switching, as shown in FIG. 6. In FIG. 9 and FIG. 10, each of the power ports p1, p2, ..., p32 of the power distribution system 12 provides a bias power, which includes bias voltage and bias current, for four driving circuits. When N driving circuits drain bias voltages simultaneously, this may be regarded as an N-simultaneous-switching, wherein N is a positive integer. The power noise and the equivalent inductances of the power distribution system 12 under various numbers of simultaneous switching are illustrated in chart 9A in FIG. 9. The power noise and the equivalent inductances are measured and determined by taking the power port p1 as the standard power port, wherein the power port p1 may be the worst power port P1 in FIG. 7 and FIG. 8. The horizontal axis of the chart 9A represents the number of simultaneous switching; the left vertical axis of the chart 9A represents the power noise, which is voltage degradation in the power distribution system caused by variant bias currents and is denoted as delta-I noise (power noise takes mV as its unit). The right vertical axis of the chart 9A represents the equivalent impedance, which takes pH as its unit. The curve denoted as SSN as shown in the chart 9A represents the variations of the power noise, and is measured according to the left vertical axis of the chart 9A. The curve denoted as Leff as shown in the chart 9A represents the variations of the equivalent inductance Leff, and is measured according to the right vertical axis of the chart 9A.

Together with the chart 9A shown in FIG. 9, the equivalent inductances and related statistics in the time domain and in the frequency domain are illustrated under various numbers of simultaneous switching in a chart 10A of FIG. 10. As shown in the chart 10A, when the number of simultaneous switching is 1, the power port p1 is conducted with a unit current Id for simulating the bias current drained by a driving circuit. When the number of simultaneous switching is 2, 3, or 4, the power port p1 is also conducted with a current having a magnitude of 2*Id, 3*Id, or 4*Id for simulating two, three, or four driving circuits of the power port p1 draining the bias current simultaneously. Therefore, when the number of simultaneous switching ranges from 1 to 4, the number of the conducted power ports is 1. When the number of simultaneous switching is 5, the power port p1 is conducted with a current of a magnitude of 4*Id, and the power port p2 is also conducted with a current of a magnitude of 1*Id. This is because a single power port can merely supply a bias current for at most four driving circuits at the same time. For simulating five driving circuits draining the bias current simultaneously, there must be two power ports:

one power port conducted with a current of a magnitude of 4*Id and another power port conducted with a current of a magnitude of 1*Id. Similarly, when the number of simultaneous switching is 6, the power port p1 is conducted with a current of a magnitude of 4*Id whereas the power port p2 is conducted with a current of a magnitude of 2*Id for simulating six driving circuits draining the bias current. When the number of simultaneous switching is 32, the power ports p1, p2, . . . , p8 are respectively conducted with a current of a magnitude of 4*Id for simulating 32 driving circuits draining the bias current simultaneously.

In other words, in the simultaneous switching analysis, when different numbers of power ports are conducted with corresponding currents, different numbers of simultaneous switching are thus simulated, and the corresponding power noise and the corresponding equivalent inductances may thus also be determined under various numbers of simultaneous switching. As shown in the chart 9A, with the increasing number of simultaneous switching, the power noise, which are represented by the curve SSN and are the voltage degradations of the power port p1, increase as well. As illustrated by the curve SSN, when the number of simultaneous switching ranges from 1 to 4, the power noise rises linearly. This is because when the number of simultaneous switching is less than five, the same power port is utilized for supplying the bias current so that the power noise rises linearly by following the properties of the same power port. However, when the number of simultaneous switching is larger than or equal to five, the curve SSN varies significantly, which represents the mutual coupling between the power ports. When the number of simultaneous switching is larger than or equal to five, more than one power port has to transmit power simultaneously. When there is no mutual coupling between the power ports, the curve SSN should rise linearly as when there is merely a single power port. However, as shown in the chart 9A, when the number of simultaneous switching is larger than four, the curve SSN rises gradually, which represents how the mutual coupling between the power ports affects the power noise.

According to the power noise (or the voltage degradation) of the power port p1 and the total current of the conducting power ports, the equivalent inductance Leff shown in FIG. 9 can thus be determined. The equivalent inductances shown in FIG. 10 can be determined in the same way. As mentioned above, while the power ports are conducting, resonant time-variant currents may be utilized for performing a frequency-domain analysis. Time-variant currents having a specific time-domain waveform may also be applied to performing a time-domain analysis. The charts shown in FIG. 10 illustrate the equivalent inductances under the time-domain analysis and under the frequency-domain analysis simultaneously. Note that as shown in chart 9A, the determined equivalent inductances represent the mutual couplings between the power ports, and thereby, the properties of the power distribution system may be quantified more precisely. Said determined equivalent inductances may also be utilized for providing a simplified circuitry of the power distribution system and for helping the chip designer simulate the non-ideal properties of the power distribution system with the simplified and precise circuitry. Please refer to FIG. 11, which is a diagram of how the circuitry of the power distribution system is built according to the present invention.

Figure 11:
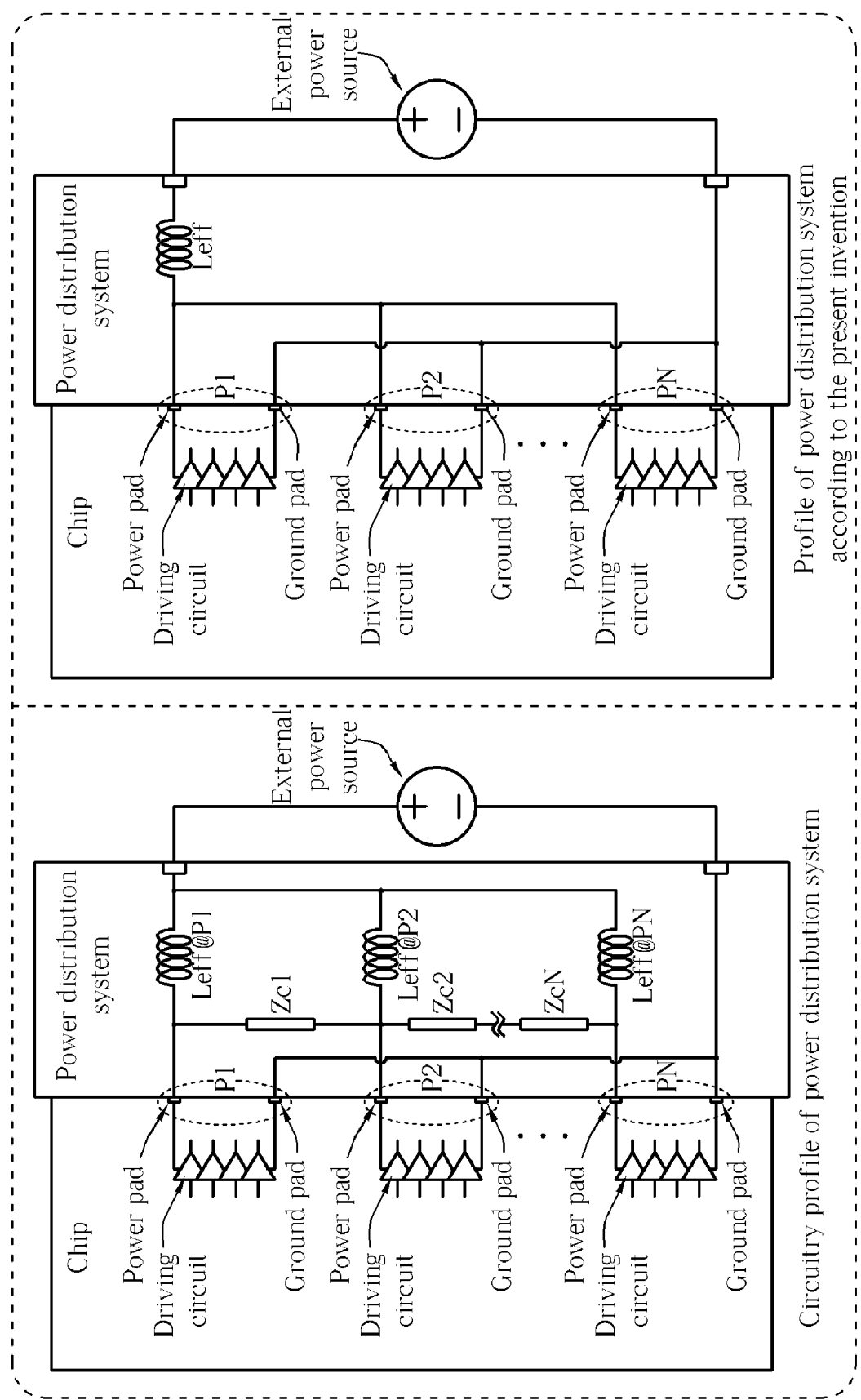
FIG. 11 is a diagram of how the circuitry of a power distribution system is built according to the present invention.

As shown in the left side of FIG. 11, each of the power ports P1, P2, . . . , PN of the power distribution system provides a bias voltage for four driving circuits. As far as the non-ideal factors of the power distribution system are concerned, there are parasitic self-inductances Leff@P1, Leff@P2, . . . , Leff@PN respectively corresponding to the power ports P1, P2, . . . , PN; there are also mutual coupling impedances Zc1, Zc2, . . . , ZcN respectively corresponding to the power ports P1, P2, . . . , PN. That is, the properties of the power distribution system can be simulated with a complex impedance network. Therefore, when the chip designer has to take the non-ideal factors of the power distribution system into consideration, the complex impedance network must be utilized for simulating detailed properties of the power distribution system, and this can make simulations of chip designs more complex. The capital and the time for designing the chip would be increased.

In comparison, by the simultaneous switching noise analysis of the present invention, the chip designer may simulate the properties of the power distribution system with simplified circuitry shown in the right side of FIG. 11. By choosing an appropriate equivalent inductance in the chart 10A of FIG. 10, the properties of the power distribution system may be simply and equivalently simulated with a common inductance Leff. For example, when there are 16 driving circuits draining a bias current of a frequency of 400 MHz during corresponding chip operation, a common inductance of 534 pH may thus be chosen for the circuitry shown in the right side of FIG. 11 according to the row relating to the number 16 of simultaneous switching in the chart 10A. Similarly, when there are 32 driving circuits simultaneously draining a bias current of a specific time-domain waveform in the chip, a common inductance of 612 pH may thus be chosen according to the row relating to the number 32 of simultaneous switching in the chart 10A. Note that the mutual couplings between the power ports have been integrated in the equivalent inductances shown in the charts 9A and 10A, and thereby, the properties of the power distribution system may be precisely quantified even if merely a common inductance Leff is chosen. By the simplified and precise circuitry built with the common inductance Leff, the chip designer may take the properties of the power distribution system into consideration rapidly and intuitively so that the circuitry of the chip may coordinate with the power distribution system. The operations of the whole integrated circuit are not restricted by the non-ideal factors of the power distribution system either.

In summary, compared with prior art analyses, the single excitation analysis, the multi-excitation analysis, and the simultaneous switching noise analysis of the present invention may quantify the properties of the power distribution system more precisely for quantifying the self-inductance of a single power port and the mutual coupling between various power ports. The designer of a packaged circuit board can detect defects of the power distribution system with the analyses provided in the present invention, and compensate for the properties relating to the defects. Therefore, the analyses of the present invention may help chip designers mitigate the effects caused by the defects for more precise chip designs. The analyses of the present invention may also help the chip designers evaluate the disposition of decoupling power sources. Moreover, overall simultaneous switching noise is analyzed and evaluated in the present invention for easily simulating the properties of the power distribution system, and for conveniently manipulating the budget of system power. The analyses of the present invention may be implemented with hardware or software. For example, while running software relating to the analyses of the present invention with computers, it helps the chip designer analyze the properties of a given power distribution system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for analyzing a power distribution system, wherein the power distribution system has a plurality of pad sets and each pad set includes a power pad and a ground pad, the method comprising:
   processing a single excitation analysis;
   obtaining equivalent impedances corresponding to pad sets of the power distribution system;
   comparing the obtained equivalent impedances of the pad sets;
   choosing a worst pad set, wherein the worst pad set has the highest equivalent impedance among the obtained equivalent impedances;
   processing a simultaneous switching noise (SSN) analysis;
   calculating an equivalent impedance of the worst pad set during simultaneous switching;
   determining whether the equivalent impedance of the worst pad set matches a design specification; and
   adding a decoupling capacitor to the worst pad set if the equivalent impedance of the worst pad set does not match the design specification.

2. The method of claim 1 wherein the single excitation analysis comprises:
   choosing one pad set from a plurality of pad sets of the power distribution system;
   making a given current flow through the power pad and the ground pad of the chosen pad set; and
   measuring a voltage between the power pad and the ground pad of the chosen pad set.

3. The method of claim 1 further comprising:
   processing a multi-excitation analysis for estimating a coupling between a given pad set and one pad set other than the worst pad set.

4. The method of claim 3 wherein the multi-excitation analysis comprises:
   making a given current flow through the power pad and the ground pad of the given pad set;
   measuring a first voltage between the power pad and the ground pad of the given pad set;
   measuring a second voltage between the power pad and the ground pad of one pad set other than the given pad set; and
   estimating a coupling degree of the given pad set and the pad set other than the given pad set according to the second voltage.

5. The method of claim 4 wherein the step of measuring a second voltage comprises measuring the voltage between the power pad and the ground pad of the pad set other than the give pad set.

6. The method of claim 4 wherein the step of measuring a first voltage and the step of measuring a second voltage are performed simultaneously.

7. The method of claim 1 wherein the simultaneous switching noise analysis comprises:
   choosing a given pad set and at least two first pad sets other than the given pad set from the power distribution system;
   making first given currents flow through the first pad sets other than the given pad set, wherein each first pad set has a first given current, and the power distribution system has a first total current including the sum of the first given currents;
   measuring the voltage between the power pad and the ground pad of the given pad set; and
   evaluating the equivalent impedance of the given pad set under the first total current.

8. The method of claim 7 wherein the simultaneous switching noise analysis further comprises:
   choosing at least two second pad sets other than the given pad set and the first pad sets from the power distribution system;
   making second given currents flow through the second pad sets other than the given pad set and the first pad sets, wherein each second pad set has a second given current, and the power distribution system has a second total current including the sum of the second given currents;
   measuring the voltage between the power pad and the ground pad of the given pad set; and
   evaluating the equivalent impedance of the given pad set under the second total current.

9. The method of claim 7 wherein the simultaneous switching noise analysis further comprises:
   revising the first given current of at least one of the first pad sets so that the power distribution system has a second total current;
   measuring the voltage between the power pad and the ground pad of the given pad set; and
   evaluating the equivalent impedance of the given pad set under the second total current.

10. The method of claim 7, wherein the first given current is a sinusoidal time-variant current of a given frequency.

11. The method of claim 7 wherein the first given current is a time-variant current of a given waveform in the time domain.

12. A method of power distribution system analysis, wherein the power distribution system comprises at least one power ports connected to the chip for transmitting a bias voltage and a current to the chip, the method comprising:
   processing a simultaneous switching noise (SSN) analysis comprising:
      choosing a plurality of conducting power ports of the power distribution system and simultaneously transmitting currents through the conducting power ports to drive a plurality of driving circuits of the chip, wherein each conducting power port has a current;
      measuring the voltage of a given power port;
      calculating an equivalent impedance of the given power port in a simultaneous switch of the driving circuits according to the current of each conducting power port and a measured voltage of the given power port;
      determining whether the equivalent impedance of the worst pad set matches a design specification; and
      adding a decoupling capacitor to the worst pad set if the equivalent impedance of the worst pad set does not match the design specification.

13. The method of claim 12 further comprising:
   processing a single excitation analysis comprising:
      choosing an under-test power port and transmitting a given current through the under-test power port;
      measuring the voltage of the given power port; and
      calculating an equivalent impedance corresponding to the under-test power port according to the measured voltage and the given current.

14. The method of claim 12 further comprising:
obtaining the equivalent impedances of the conducting power ports of the power distribution system; and
comparing the equivalent impedances of the conducting power ports for choosing a worst power port, wherein the worst power port has the highest equivalent impedance among the compared equivalent impedances.

15. The method of claim 12 further comprising:
transmitting a given current through the given power port;
measuring the voltage of the given power port;
measuring voltages of the other conducting power ports of the power distribution system; and
evaluating coupling degrees among the given power port and the other conducting power ports.

16. The method of claim 12 wherein the step of processing a SSN analysis further comprises:
choosing another plurality of conducting power ports from the power distribution system to transmit currents for driving the driving circuits of the chip;
measuring the voltage of the given power port; and
calculating the equivalent impedance of the given power port in the simultaneous switch of the driving circuits.

17. The method of claim 12 wherein the step of processing a SSN analysis further comprises:
choosing another conducting power ports to transmit currents for driving the different driving circuit of the chip;
measuring the voltage of the given power port; and
calculating the equivalent impedance of the given power port in the simultaneous switch of the driving circuits.

18. The method of claim 12 wherein the current for driving the driving circuit of the chip is a sinusoidal time-variant current of a given frequency.

19. The method of claim 12 wherein the current for driving the driving circuit of the chip is a time-variant current of a given waveform in a time domain.

\* \* \* \* \*